United States Patent [19]

LeDevehat

[11] Patent Number: 4,515,182

[45] Date of Patent: May 7, 1985

[54] PIPE COUPLING WITH VALVE CLOSURE SAFETY SYSTEM

[75] Inventor: Eugene R. LeDevehat, Saligny, France

[73] Assignee: FMC Corporation, Chicago, Ill.

[21] Appl. No.: 443,100

[22] Filed: Nov. 19, 1982

[51] Int. Cl.³ .................. F16L 23/04; F16L 37/28
[52] U.S. Cl. .................. 137/614.06; 251/149.9; 285/1; 285/408
[58] Field of Search .................. 137/614.06, 614.02, 137/637.05; 251/149, 149.9; 285/1, 365, 408, DIG. 21, 409

[56] References Cited

U.S. PATENT DOCUMENTS

| | | | |
|---|---|---|---|
| 4,231,398 | 11/1980 | Gibbons | 137/614.06 X |
| 4,306,739 | 12/1981 | Bormioli | 285/409 X |
| 4,309,049 | 1/1982 | Chevallier | 285/365 X |
| 4,354,522 | 10/1982 | Bormioli | 137/614.02 |

Primary Examiner—A. Michael Chambers
Assistant Examiner—John C. Fox
Attorney, Agent, or Firm—W. W. Ritt, Jr.; Richard B. Megley

[57] ABSTRACT

A quickly and safely releasable pipe coupling for connecting two adjacent pipe flanges, the coupling including a mechanical interlock system that prevents release of the flange connection when one or more valves in the pipe is not fully closed, and to effect valve closure and then coupling release by means of a coupling release jack when the valve closure control system is inoperative.

14 Claims, 23 Drawing Figures

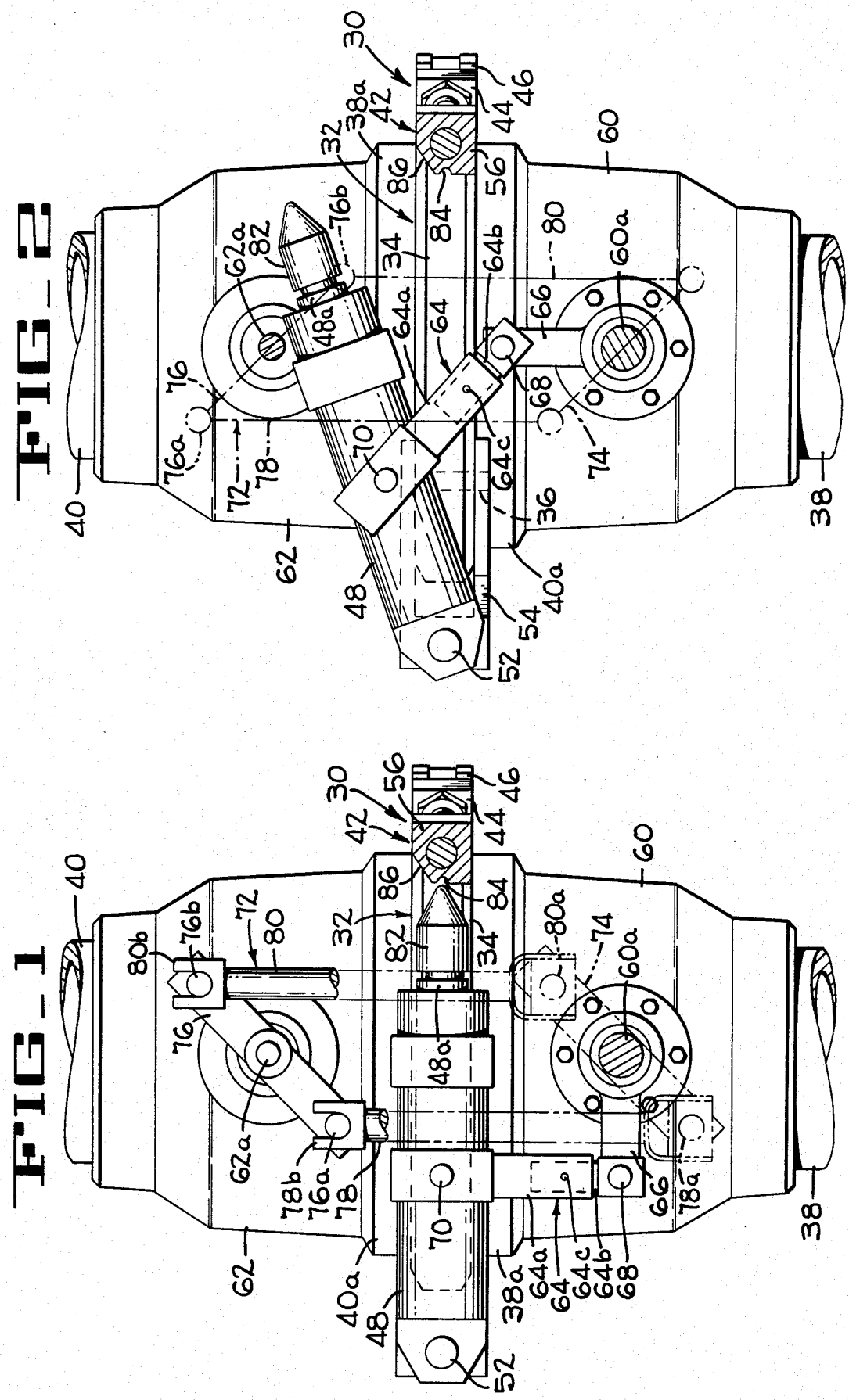

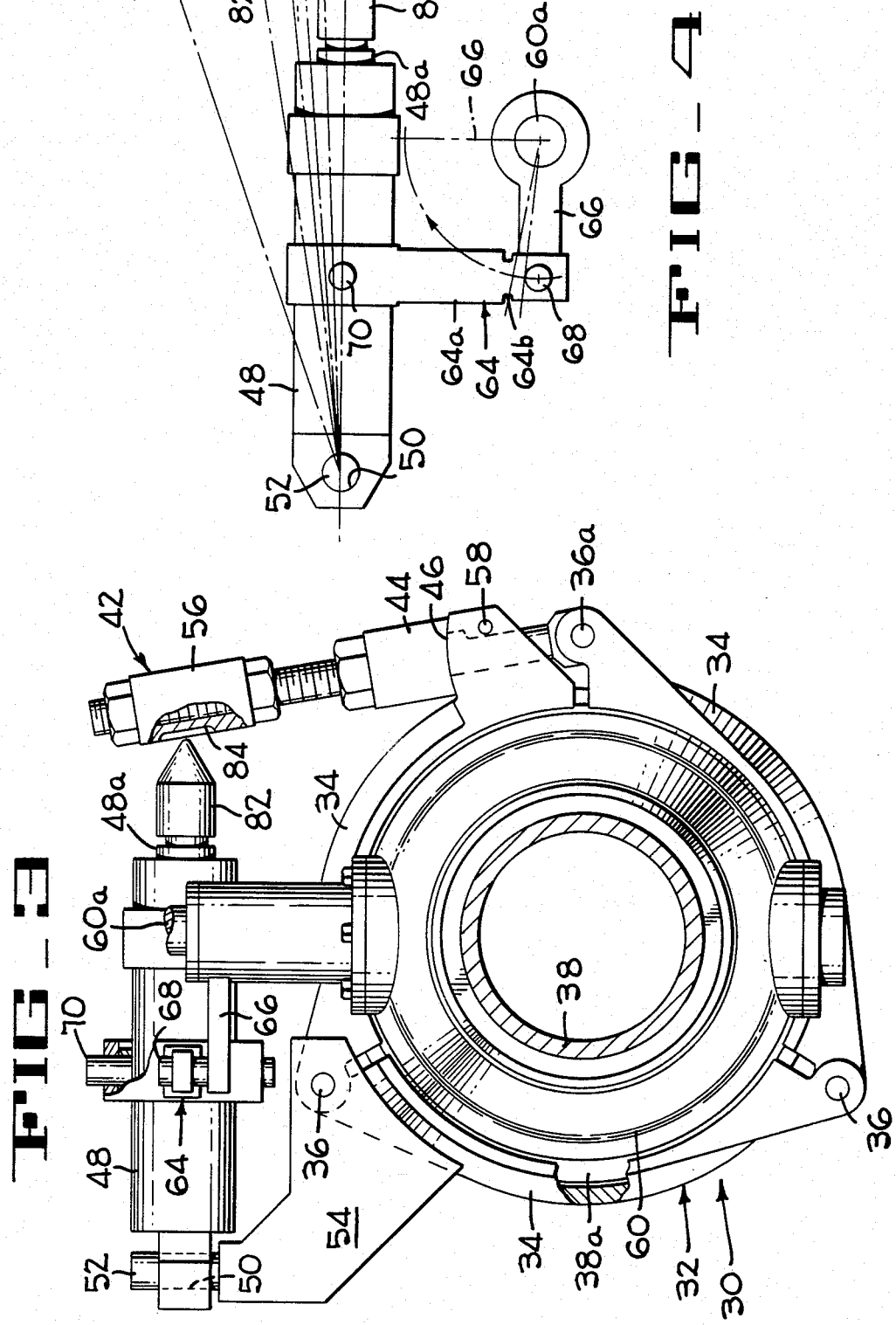

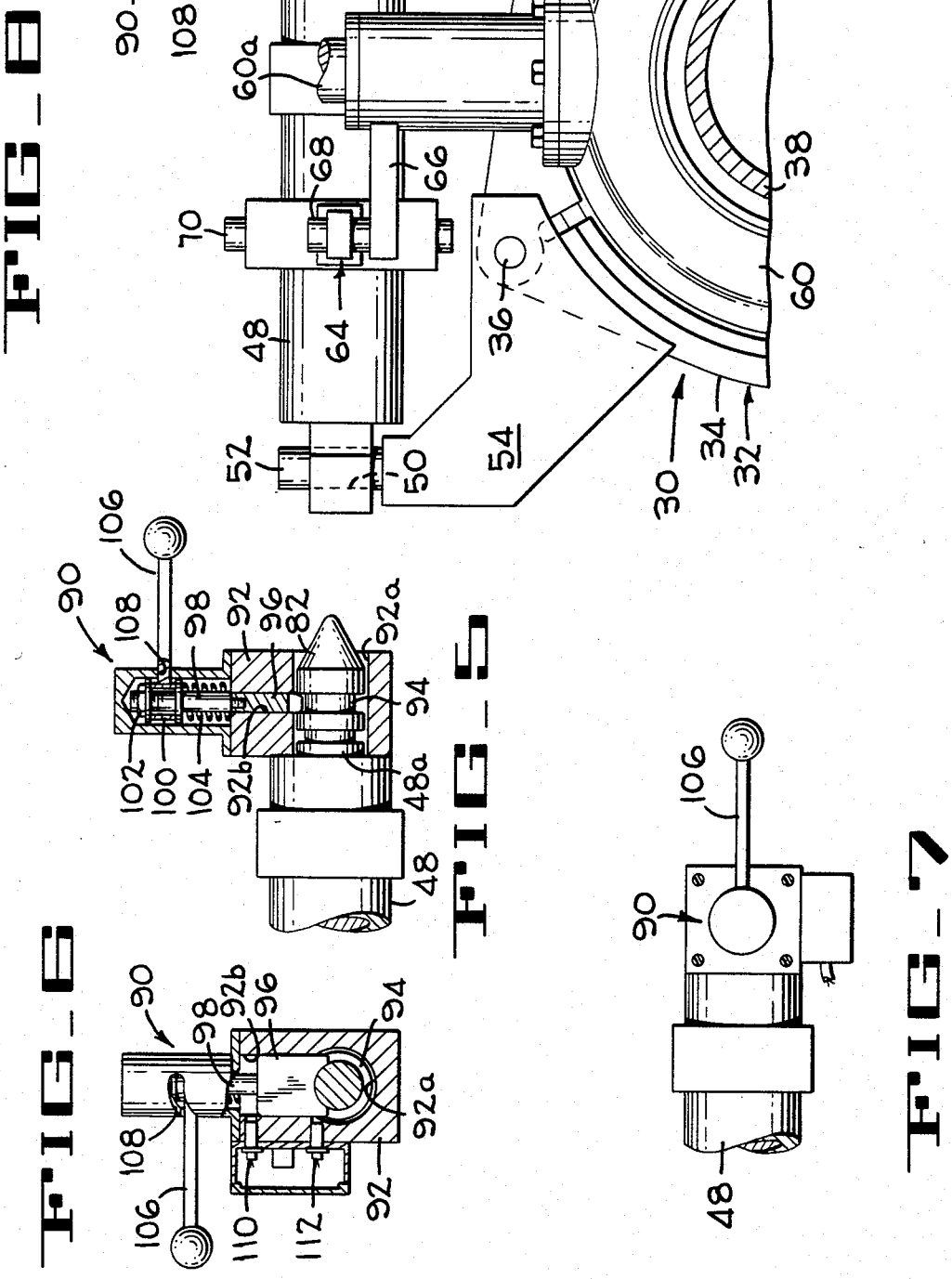

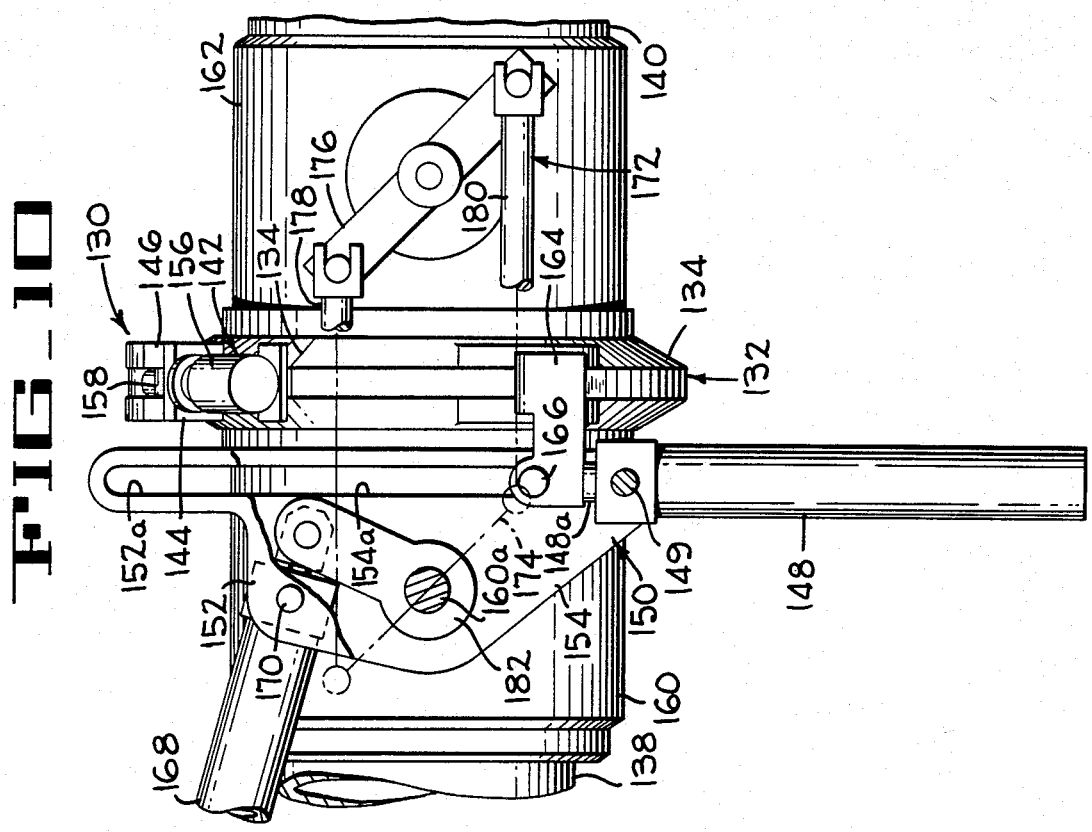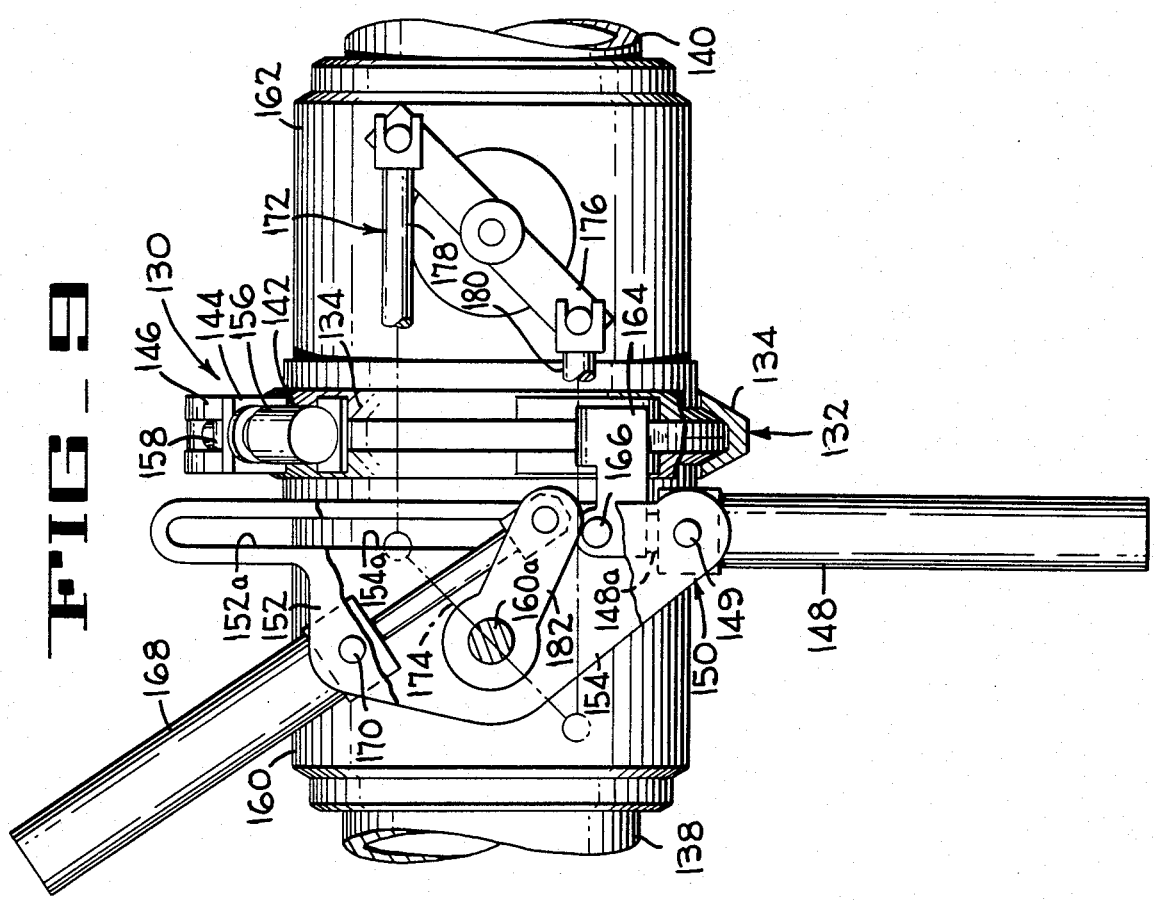

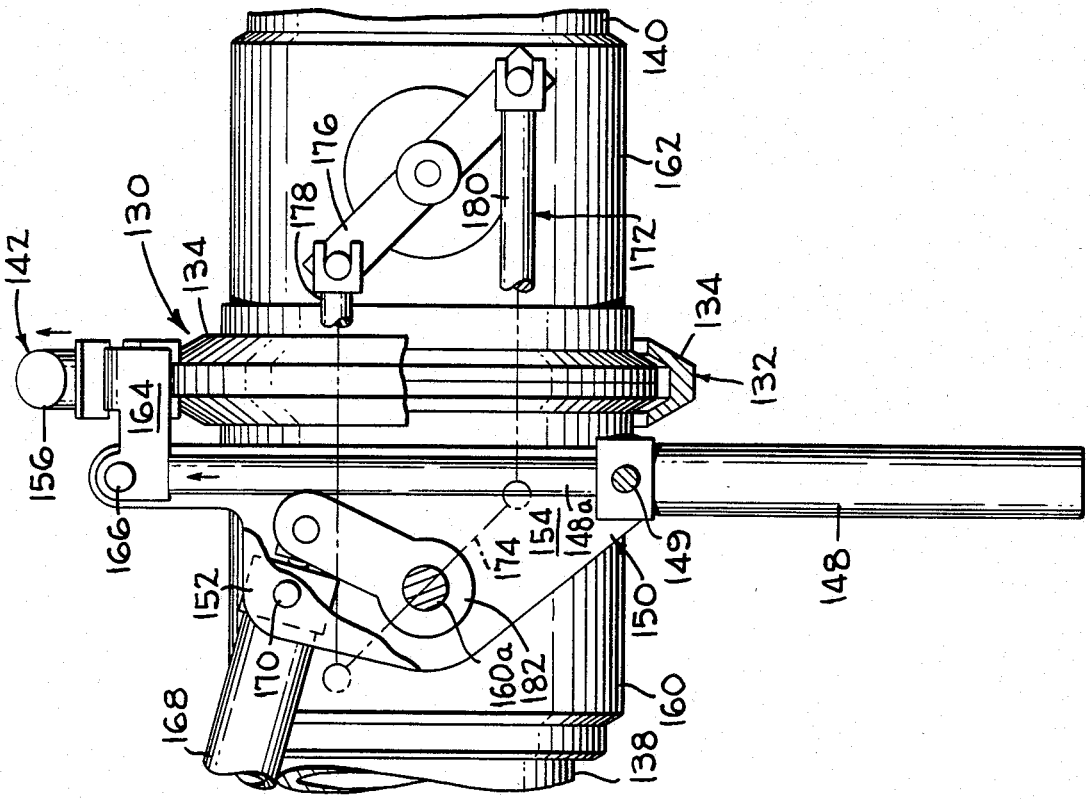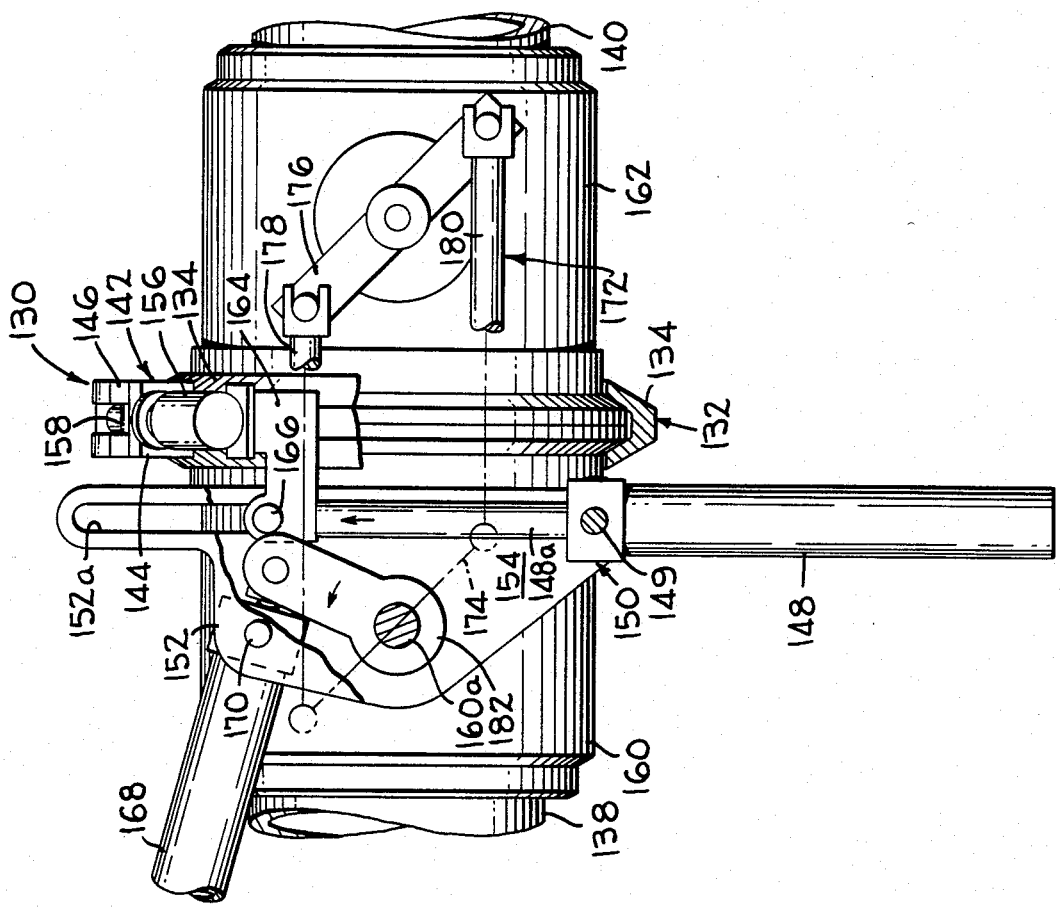

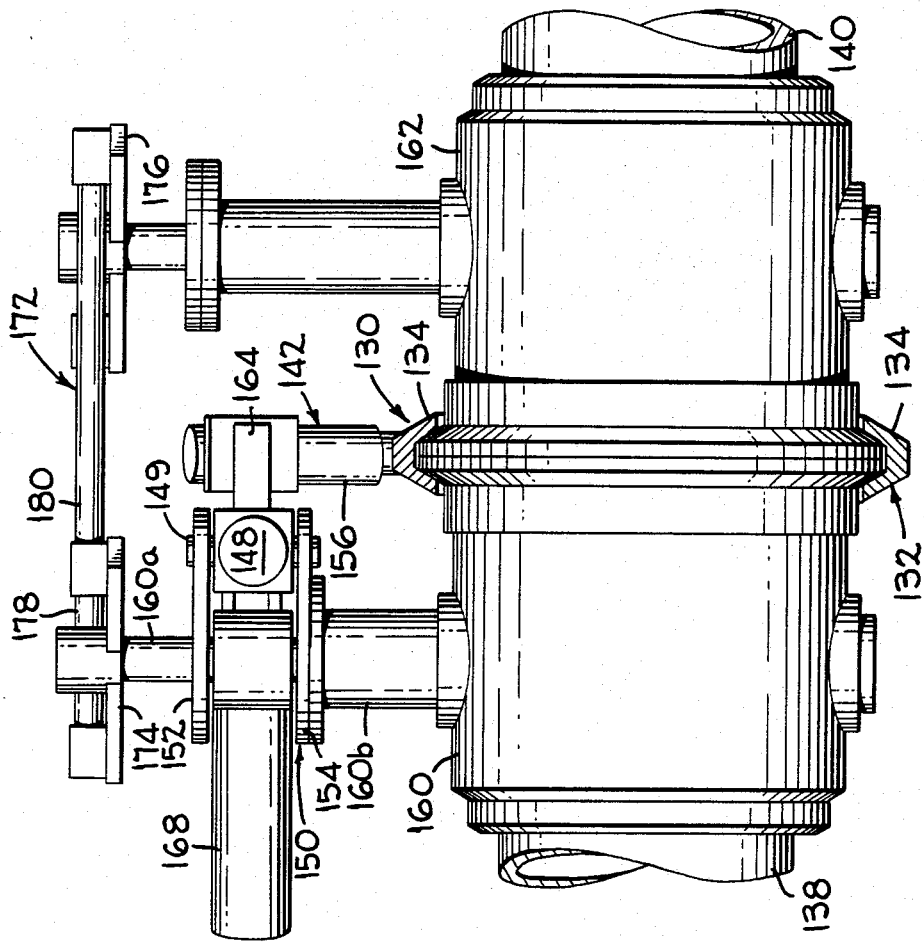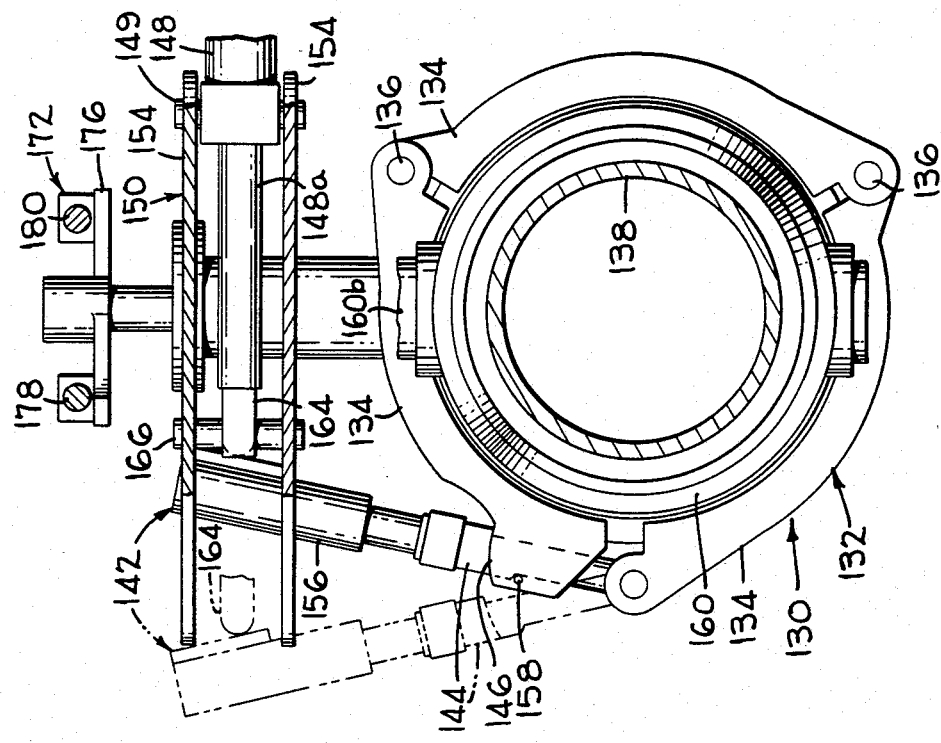

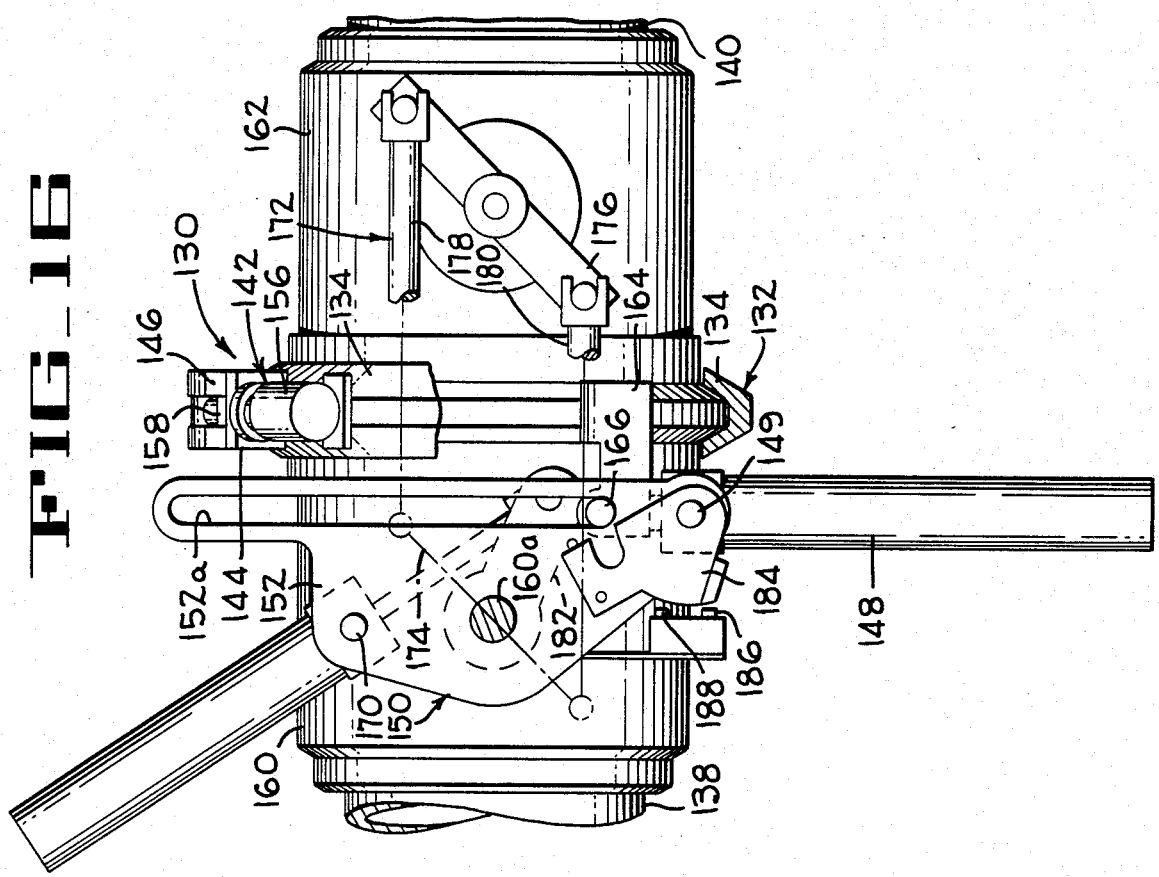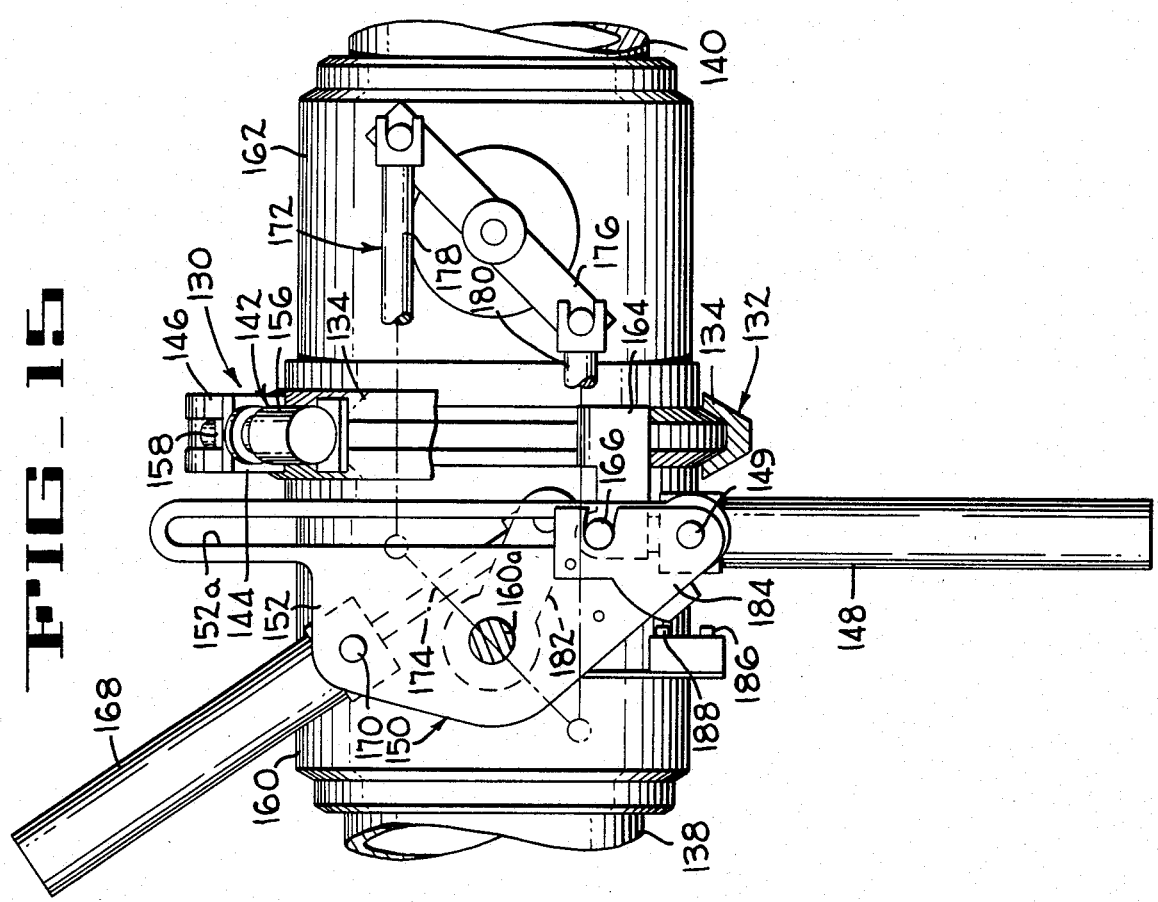

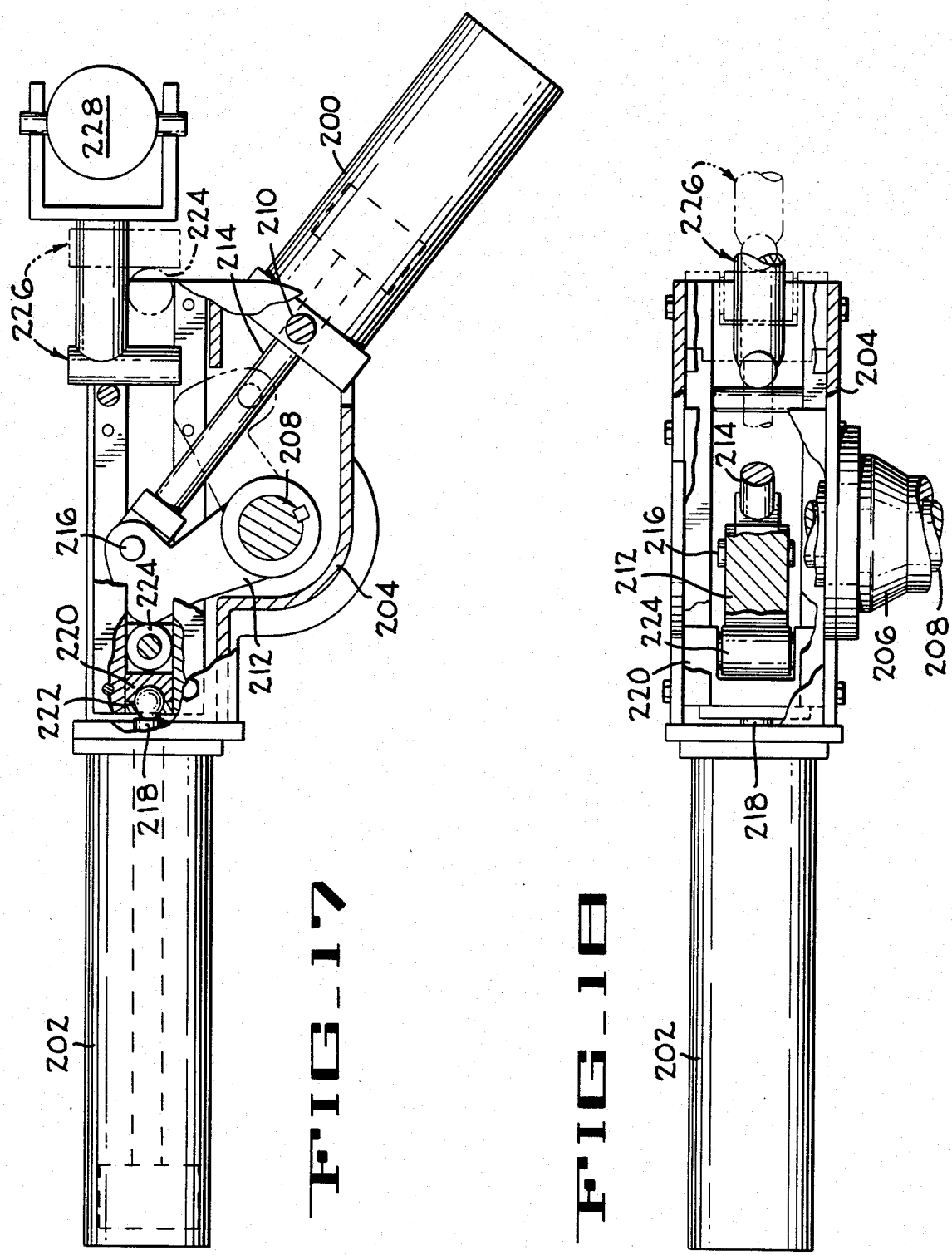
FIG_17
FIG_18

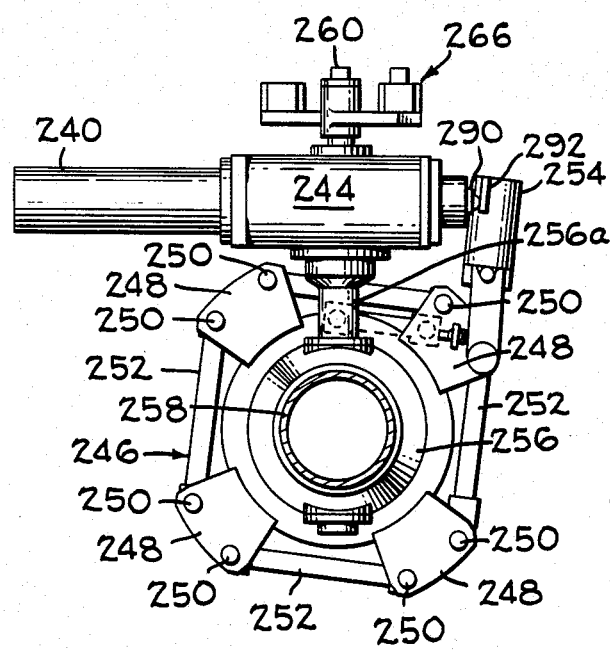
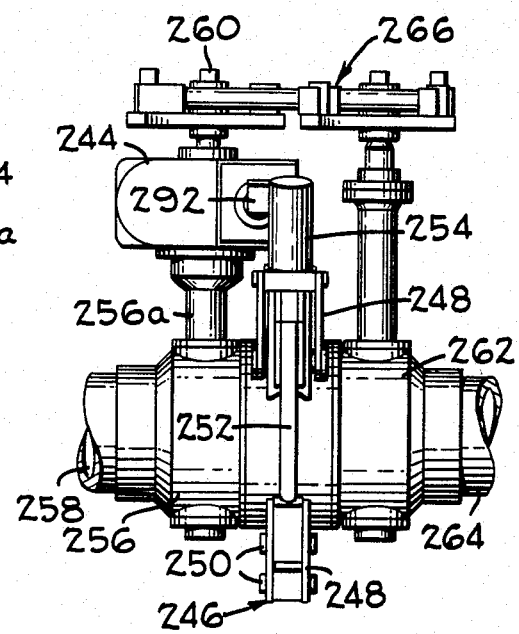
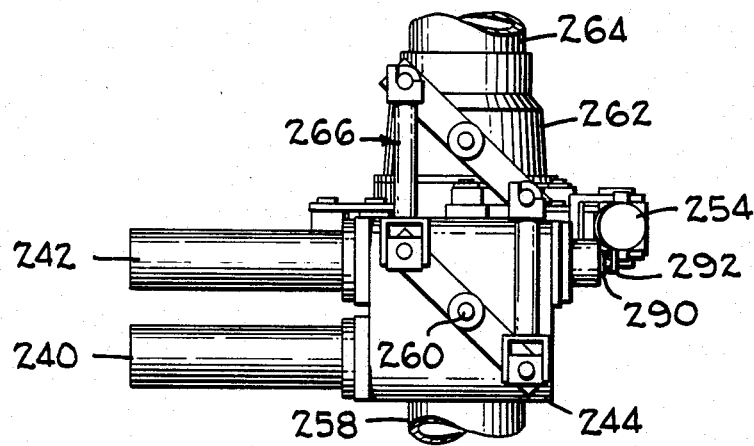

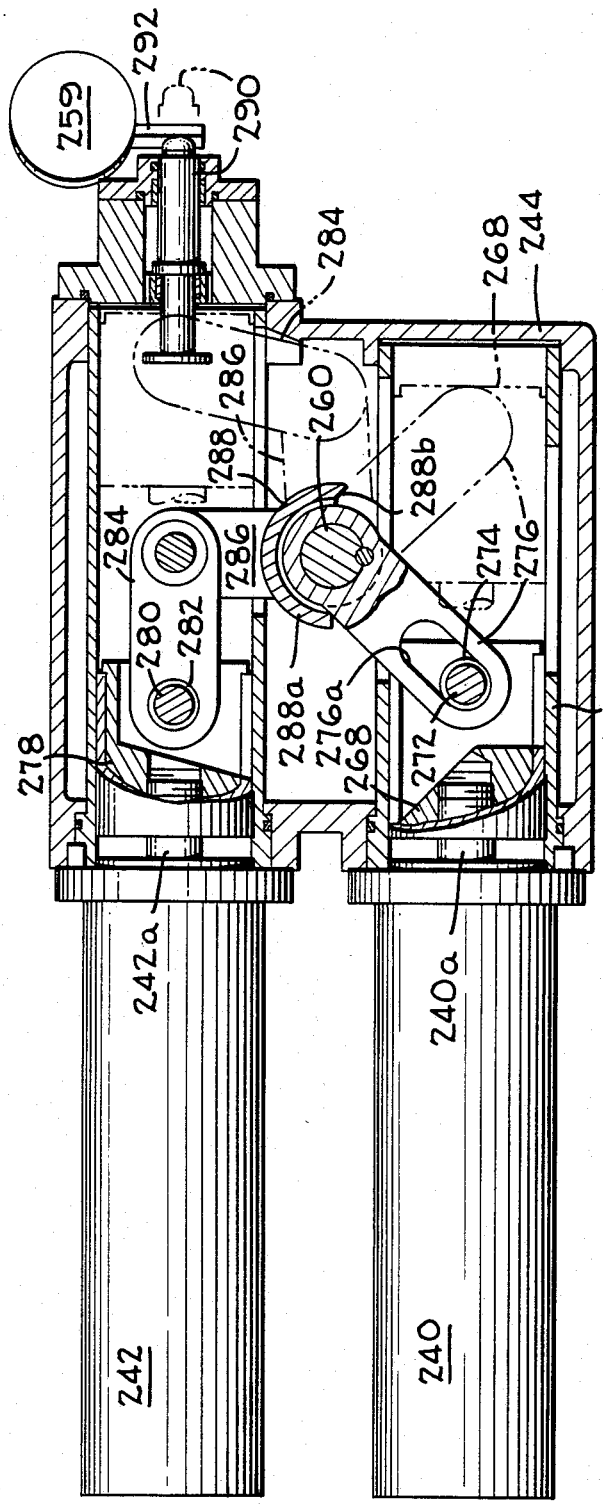
FIG_22
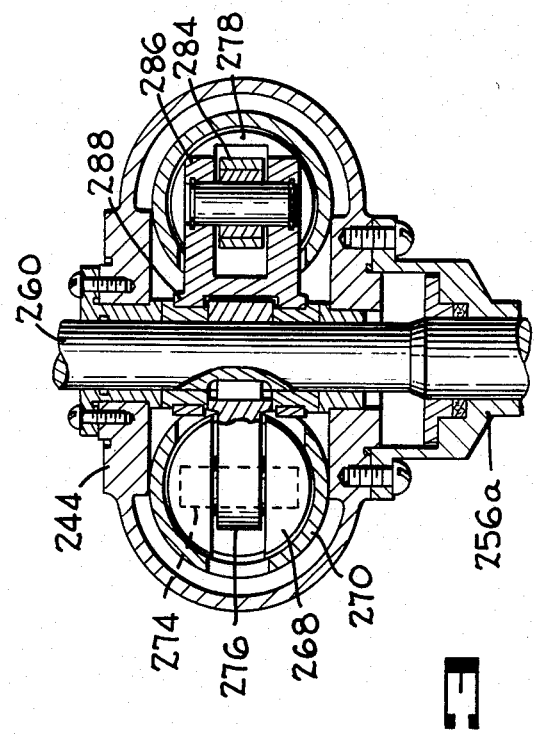
FIG_23

PIPE COUPLING WITH VALVE CLOSURE SAFETY SYSTEM

BACKGROUND OF THE INVENTION

This invention relates to pipe couplings, and more particularly to quickly releasable couplings for clamping pipe or hose flanges together, as, for example, the flange of a fluid loading arm to the flange of a marine tanker manifold.

Releasable pipe couplings are commonly used in making fluid-tight connections in a quick, secure and safe manner between marine tanker manifolds and articulated fluid loading arms mounted on docks or other transfer terminals. One very satisfactory coupling device for this purpose is described in U.S. Pat. No. 4,309,049, granted on Jan. 5, 1982 to Bernard Chevallier, and that description is expressly incorporated herein by reference. Often both the tanker manifold and the loading arm include a flow control valve, and for safety reasons it is important that these valves are closed before the connection between the manifold and arm is broken.

SUMMARY OF THE INVENTION

The present invention comprises a quickly releasable pipe coupling with a mechanical system for assuring that the coupling is not released from its engagement with a pair of opposed fluid conduit pipe flanges until flow control valves in the fluid conduits are closed. The invention prevents untimely disconnection of the conduits with the valves open, and also facilitates closure of the valves by operation of the coupling's release mechanism when the control system for the valves is inoperable.

BRIEF DESCRIPTION OF THE DRAWINGS

FIG. 1 is a plan view of two flanged pipe ends connected together by a releasable pipe coupling according to the present invention, showing the conduit valves closed and the hydraulic control jack for releasing the coupling in functional position.

FIG. 2 is a view like FIG. 1, but showing the conduit valves open and the coupling control jack in nonfunctional position.

FIG. 3 is an end elevation of the apparatus of FIG. 1.

FIG. 4 is a diagrammatic illustration, in plan, of the coupling control jack, the linkage that interconnects the jack body to a rotary valve stem, and the grooved nut on the coupling release knife against which the head of the jack rod presses during the release operation.

FIG. 5 is a fragmentary view of the front end portion of the coupling control jack showing, in vertical section, a manually operated lock assembly mounted on the jack body for locking the jack rod against axial movement.

FIG. 6 is an end elevation, partially in section, of the lock assembly of FIG. 5.

FIG. 7 is a fragmentary plan view of the apparatus shown in FIG. 5.

FIG. 8 is a fragmentary end elevation similar to FIG. 3, showing the lock assembly of FIGS. 5-7 in operative location on the coupling.

FIG. 9 is a plan view, with parts broken away, of a second embodiment of the present invention, showing the coupling in locked engagement with the opposed pipe flanges and the flow control valves open.

FIG. 10 is a view like FIG. 9, but showing the position of the elements with the valves closed.

FIG. 11 is a view like FIG. 10, but showing the coupling control jack rod partially extended into contact with the coupling release knife.

FIG. 12 is a view like FIG. 11, but showing the coupling control jack rod fully extended and the coupling released.

FIG. 13 is a front elevation, partially in section, of the apparatus as illustrated in FIG. 11, showing in phantom the coupling release knife in the released condition of FIG. 12.

FIG. 14 is a side elevation of the apparatus shown in FIG. 13.

FIG. 15 is a view like FIG. 9, but showing a manually operated coupling control jack lock in locking position.

FIG. 16 is a view like FIG. 15, showing the control jack lock in unlocked position.

FIG. 17 is a plan view, with some parts broken away, of a third embodiment of the present invention, showing the relative position of the elements when the valve, to which this embodiment is attached, is open.

FIG. 18 is a side elevation, with parts broken away, of the apparatus of FIG. 17.

FIG. 19 is an end elevation of a fourth embodiment of the present invention.

FIG. 20 is a side elevation of the apparatus of FIG. 19.

FIG. 21 is a plan view of the apparatus of FIGS. 19 and 20.

FIG. 22 is a plan view, on an enlarged scale and with parts broken away, of the hydraulic jacks and control linkage of the FIGS. 19-21 embodiment.

FIG. 23 is an end elevation in section of the apparatus shown in FIG. 22.

DESCRIPTION OF THE EMBODIMENTS

FIGS. 1-8

Referring first to the embodiment of FIGS. 1-8, the pipe coupling 30 according to the present invention comprises a clamping collar 32 with three arcuate segments 34 articulated to one another by pivot pins 36, the collar 32 clampingly surrounding flanges 38a, 40a of pipe sections 38, 40 which are brought into contact with each other during the connecting operation. The segments 34 define a circle which is closed by means of a knife element 42 pivotally secured to one of the segments and having a wedge 44 that bears on a ramp 46 formed on one of the other segments 34. A hydraulic control jack 48, which is articulated through an eye 50 to a pivot pin 52 of a support bracket 54 that is secured to one of the segments 34, acts on a grooved nut 56 disposed on the knife element 42, causing the knife to break a safety retainer pin 58 and tip over outwardly (pivot clockwise about the pin 36a as viewed in FIG. 3), thereby releasing the coupling from its connecting position about the pipe flanges.

When this pipe coupling is employed to connect a marine loading arm to a marine tanker manifold, each of the flanged pipe sections 38, 40 includes a flow control valve 60, 62, respectively for closing the arm and manifold. The axis of the control jack pivot pin 52 is disposed parallel to the axes of the valve stems 60a, 62a, and a pair of links 64, 66, which are hinged together at 68, connect the jack 48 to the arm valve stem 60a. The link 66 is fixed to the stem 60a, and the link 64 is hinged at 70 to the jack body. Thus as the valve stem 60a is rotated to change the status of the valve between closed (FIG. 1) and open (FIG. 2), the jack 48 pivots about the pin 52 between the two positions shown in FIGS. 1 and 2.

The link 64 comprises a sleeve section 64a hinged to the jack 48 at 70, and a rod section 64b received in the sleeve section 64a and pivotally connected to the link 66 at 68. A shear pin 64c retains the sections 64a, 64b in connected condition, so that when the pin 64c is broken the jack 48, and of course the rest of the pipe coupling assembly 30, are functionally disconnected from the valve 60.

The valve stems 60a, 62a are interconnected by a deformable parallelogram linkage system 72 so that the stems rotate in unison. The linkage system 72 comprises a pair of parallel bars 74, 76 fixed to the stems 60a, 62a, respectively, and a pair of parallel rods 78, 80 extending between the bars 74, 76. One end of each of the rods 78, 80 is hinged to the bar 74 at 78a, 80a, respectively, and at their other ends the rods terminate in forks 78b, 80b that receive pivot pins 76a, 76b on the bar 76. Accordingly, when the pipe coupling 30 is released from the pipe sections 38, 40, the sections can be moved apart axially, disconnecting the rods 78, 80 from the bar 76.

The control jack 48 has a conical head 82 at the outer end of its rod 48a, and this head cooperates with a V-shaped groove 84 in the nut 56 to retain the rod in proper alignment with the nut as the rod is extended from the jack body during the coupling release operation. When the tip of the conical head 82 resides in the groove 84 or is very close to alignment therewith, the pushing action of the jack rod 48a results in a direct force upon the nut 56 as the jack 48 is operated, thereby causing the knife 42 to break the retainer pin 58 and cleanly release the coupling from the pipe sections.

When opening of the valve 60 is commenced, the control jack 48 pivots about the pin 52 towards its position shown in FIG. 2 wherein the valve 60, and also the valve 62 by virtue of the linkage system 72, are fully open. This pivoting causes the tip of the conical head 82 to move out of alignment with the nut groove 84, and when sufficient pivotal movement has occurred the head escapes from the groove. One side of the grooved nut 56 has an escape chamfer 86, so that if the jack 48 is actuated after the tip of the conical head has pivoted out of alignment with the groove, the head will move along the chamfer instead of causing movement of the knife 42, thereby not disturbing the connected condition of the pipe coupling 30.

As seen in FIG. 4, which illustrates a comparison between the rotation of the valve stem 60a and the deviation of the control jack 48 from alignment with the nut 56, when the jack 48 has been pivoted approximately 2.5 degrees the tip of its conical head is aligned with the escape chamfer 86. In that position the valve's flow control element (not shown) has been rotated approximately 5 degrees. Total escape of the conical head from the nut 56 occurs when the jack has pivoted approximately 6.5 degrees, which corresponds to a 10 degree rotation of the flow control element. When the valve is fully open, i.e., when the flow control element has been rotated 90 degrees, the jack will reside at an angle of approximately 20 degrees from alignment with the nut groove 84. These relative positions of the jack and the valve flow control element are facilitated by proper spacing of the pivots 52, 70 and 68. In the illustrated embodiment, the distance between the pivots 70 and 68 is equal to the distance between the pivots 70 and 52.

If desired the apparatus described above can be modified by including a manually operated lock assembly 90 (FIGS. 5–8) for locking the control jack rod 48a against undesired axial movement. This is especially useful for preventing release of the pipe coupling assembly 30 when the loading arm is in a resting position or during the operation when both valves are closed.

The lock assembly 90 comprises a housing 92 having a bore 92a through which the jack rod 48a passes. An annular groove 94 behind the rod's conical head 82 receives a knife 96 that resides in a slot 92b in the housing 92, and that is movable in a translatory manner into or out of the groove. A stem-like rod 98 extends upwardly from the knife 96, and a sleeve 100 is disposed on the rod between an abutment-forming nut 102 that is threaded on the upper end of the rod and a spring 104 that slidingly surrounds the rod and rests on the housing 92. Secured to the sleeve 100 is a manual control lever 106 that extends laterally outward through a curved slot 108 in the side of a cylindrical extension of the housing 92, so that by moving the lever along the slot the knife 96 moves toward or away from the groove 94 in the jack rod head 82.

In order to detect the position of the knife 96 with respect to its housing 92, and thus with respect to the rod head groove 94, sensors 110, 112 are disposed in the housing. Sensor 110 detects the knife 96 in the unlocked position which permits emergency release of the pipe coupling, and sensor 112 detects the knife in its locked position wherein such coupling release is prevented.

FIGS. 9–16

In the second embodiment of the invention illustrated in FIGS. 9–16 there also is a direct connection between the valve control and the pipe coupling release jack. The pipe coupling assembly 130 of this second embodiment is similar in several respects to the assembly 30, having a collar 132 formed by three arcuate segments 134 pivotally interconnected by pivot pins 136, a knife element 142 pivotally secured to one of the segments 134 and with a wedge 144 that bears on a ramp 146 of that segment, and a safety retainer pin 158 that is broken by the knife as it is forced to pivot outwardly away from the collar 132 in response to actuation of a coupling control jack 148. Also as in the earlier described embodiment, the two flanged-end pipe sections 138, 140 each have a flow control valve 160, 162, and these valves are interconnected for operation in unison by means of a parallelogram linkage system 172 comprising bars 174, 176 and rods 178, 180 to which they are pivotally connected.

The coupling control jack 148 is secured by a pin 149 to a support bracket 150, comprising upper and lower parallel plates 152, 154, respectively, and this bracket is fixed to the extension 160b of the body of the valve 160. The jack 148 acts upon a nut 156 on the knife 142 through a slidable carriage 164 that is mounted on the end of the jack's rod 148a and retained in position between the two bracket plates 152, 154 by a pin 166 that extends through two parallel guide slots 152a, 154a in the plates.

A valve control jack 168 is pivotally secured between the two plates 152, 154 by a pin 170, and this jack acts through a link 182 that is fixed to the valve stem 160a to open and close the loading arm valve 160 and, through the parallelogram linkage system 172, simultaneously the manifold valve 162.

The operation of this embodiment occurs in two steps. The first step corresponds to the closing of the valves 160, 162 by actuation of the valve control jack 168 from the position shown in FIG. 9 to that shown in FIG. 10. The second step involves release of the pipe coupling collar 132 from the pipe section flanges by actuation of the coupling control jack 148 from its position shown in FIG. 10, through its FIG. 11 position, and into the FIG. 12 position.

In the event the valve control jack 168 is inoperative, the coupling control jack 148 can fulfill a second function, i.e., closing the valves 160, 162. This is accomplished when the coupling control jack is actuated while the valve control jack is either in its "valves open" position of FIG. 9 or somewhere between that and its "valves closed" position of FIG. 10. In either case, when the carriage guide pin 166 contacts the link 182 it forces the link to pivot counterclockwise (as viewed in FIG. 9) until the link arrives in the position shown in FIG. 11, at which position the valves 160, 162 are closed and the carriage pin can proceed to its FIG. 12 position wherein the coupling is released. Thus the coupling control jack can, if required, carry out both operational steps of closing the valves and releasing the coupling, and this facility is especially advantageous when, for example, the hydraulic circuit (not shown) of the valve control jack 168 is out of operation.

As shown in FIGS. 15 and 16, a manually operated lock 184 can be included in this embodiment of the invention for locking the carriage 164 in its retracted position (FIG. 15), thereby preventing undesired release of the coupling when, for example, the arm is in a rest position or during operation with the valves closed. The lock 184 has a hook shape and is pivotally mounted on the pin 149 above the support plate 152. The hook portion of the lock engages the carriage pin 166 in its locked position (FIG. 15), and is pivoted free of that pin into its unlocked position (FIG. 16). A pair of sensors 186, 188 are mounted on the support bracket 150 in position to monitor the position of the lock 184, the sensor 186 responsive to the lock's unlocked position and the sensor 188 sensing the locked position.

FIGS. 17 and 18

As in each of the previously described embodiments, the embodiment of the invention illustrated in FIGS. 17 and 18 also includes a direct connection between the valve control and the coupling release jack. As seen best in FIG. 17, both the valve control jack 200 and the coupling release jack 202 are mounted on a housing 204 that is secured in a fixed manner to the valve body neck portion 206 through which extends the valve stem 208. The valve control jack 200 is pivotally secured to the housing by a pin 210, whereas the coupling release jack 202 is fixedly secured to the housing.

A link 212 interconnects the valve stem 208, to which it is fixed, and the valve control jack rod 214 to which it is pivotally connected by a pin 216. The rod 218 of the coupling release jack 202 is connected to a slidable carriage 220 by means of a ball and socket-type joint 222, and the carriage includes a rotatable sleeve 224 that functions as a bearing first between the carriage and the link 212, and then between the carriage and a strut 226 that extends from the coupling release knife 228.

In normal operation the valve control jack 200 is actuated to rotate the link 212, and thus the valve stem 208, clockwise (as viewed in FIG. 17) from its illustrated "valve open" position to its "valve closed" position shown in phantom. Until the "valve closed" position is reached the coupling release jack cannot pass by the link 212, and thus cannot contact and move the strut 226 to release the coupling. Accordingly, undesired coupling release, such as when the valve is not closed, is prevented.

This embodiment of the invention also includes the advantage of a dual function coupling release jack, since as in the embodiment of FIGS. 9-16, the jack 202 can effect closing of the valve, prior to commencing its coupling release function, if the valve control jack 200 is inoperative. In such a case, as the carriage 220 begins to move in response to actuation of the jack 202 the sleeve 224 forces the link 212, and thus the valve stem 208, to rotate clockwise (FIG. 17) until the carriage can pass by, at which point the link has arrived in its "valve closed" position shown in phantom. Thus the coupling release jack 202 can perform both steps; i.e., valve closure and then coupling release, necessary to safe yet quick operation of this pipe coupling system.

FIGS. 19-23

The fourth, and preferred, embodiment of the present invention, illustrated in FIGS. 19-23, comprises a valve control jack 240, a coupling release jack 242, a housing 244 on which both jacks 240, 242 are fixedly mounted in side-by-side parallel relation, and a pipe coupling assembly 246 comprising four arcuate segments 248 (FIG. 19) that are pivotally interconnected by pivot pins 250 and links 252 to form a collar to grip and hold two abutting pipe section end flanges together, and a coupling release knife 254.

The housing 244 is mounted in fixed relationship on an extension 256a (FIGS. 19 and 20) of the body of a valve 256 located in one of the flanged end pipe sections 258, this extension having a bore through which the valve stem 260 (FIGS. 22 and 23) extends. If, as in the previously described embodiments, a second valve is included in the pipe system, such as a valve 262 in the other flanged end pipe section 264, a parallelogram linkage assembly 266 of the type described above is employed to interconnect the stems of both valves so that they are rotated in unison.

As illustrated in FIGS. 22 and 23, fixed to the outer end of the rod 240a of the valve control jack 240 is a carriage 268 that is axially slidable in a cylindrical track 270 that extends from the jack 240 to the opposite end of the housing 244. A support pin 272 surrounded by a rotatable sleeve 274 is mounted on the carriage 268 transversely to the axis of the rod 240a, and a slotted link 276 that is fixed to and extends radially from the valve stem 260 interconnects the carriage 268 and that stem, with the pin 272 and sleeve 274 extending through the slot 276a. Thus, from the "valve closed" position shown in full in FIGS. 22 and 23, when the valve control jack 240 is actuated the carriage 268 is moved along the track 270 into the "valve open" position shown in phantom, simultaneously rotating the link 276, and of course the valve stem 260, counterclockwise (FIG. 22) into its "valve open" position indicated in phantom.

A carriage 278, similar to the carriage 268, is fixed to the rod 242a of the coupling release jack 242, and a support pin 280 surrounded by a rotatable sleeve 282 functions to pivotally connect the carriage 278 to one end of a link 284. The other end of the link 284 is pivotally connected to one end of a link 286, and at its other end the link 286 includes a sleeve 288 that rotatably surrounds the valve stem 260, and that is cut away in its central area to form a generally semi-circular portion 288a that resides at the same level as the link 276. Accordingly, when the valve is open, and thus the link 276 is in the position indicated in phantom in FIG. 22, the link 276 functions as a stop with respect to the link 286, preventing rotation of the link 286 in a clockwise direction, and thus preventing movement of the carriage 278 towards its "coupling released" position indicated in phantom (FIG. 22). As a result, the mechanical interlock formed by these links prevents unintentional release of the coupling from the pipe flanges when the valve is not fully closed.

With the valve closed and the link 276 in its illustrated "closed" position, the coupling release jack can function to advance the carriage 278 from its illustrated "coupling locked" position towards its "coupling released" position shown in phantom. During this advance the link 284 contacts and axially moves a pin 290 that bears against a laterally extending pad 292 fixed to the coupling's knife 254, causing the knife to pivot outwardly away from the housing 244 and release the coupling segments 248 from their connecting grip on the surrounded pipe flanges.

If the valve control jack 240 becomes inoperative when the carriage 268 and the link 276 are in a position other than their "valve closed" position shown in full in FIG. 22, actuation of the coupling release jack 242 will cause the surface 288b of the link sleeve portion 288a to bear against and force clockwise rotation of the link 276, and thus like rotation of the valve stem 260, until the valve is closed. From that point continued actuation of the jack 242 causes the link 284 to contact the pin 290 and ultimate release of the coupling as described above. Accordingly, the coupling release jack 242 is capable of performing a dual function, in two steps, as can the corresponding jacks 148, 202.

Although the best mode contemplated for carrying out the present invention has been herein shown and described, it will be apparent that modification and variation may be made without departing from what is regarded to be the subject matter of the invention.

I claim:
1. A quickly and safely releasable pipe coupling assembly for connecting together opposed flange ends of two pipe sections, at least one of said pipe sections including a valve with a flow control element and a stem for rotating said element between open and closed positions, said coupling assembly comprising:
   (a) a plurality of arcuate segments with means for securing the flanged pipe ends together;
   (b) pivot means interconnecting the arcuate segments to form a collar having two connectable end portions;
   (c) collar release means functionally associated with the end portions for releasably securing said end portions together;
   (d) first fluid power means functionally associated with the collar release means and the valve for releasing the end portions from each other; and
   (e) means for preventing actuation of the collar release means by the first fluid power means unless the valve flow control element is in its closed position.

2. A pipe coupling assembly according to claim 1 wherein the means for preventing actuation of the collar release means by the first fluid power means comprises a mechanical link connected to the valve stem for rotation therewith and extending into functional cooperation with said first fluid power means.

3. A pipe coupling assembly according to claim 2 wherein the first fluid power means comprises a fluid-powered jack.

4. A pipe coupling assembly according to claim 2 including second fluid power means functionally associated with the link to rotate the valve stem by application of force to said link.

5. A pipe coupling assembly according to claim 4 wherein the second fluid power means comprises a fluid-powered jack.

6. A pipe coupling assembly according to claim 4 wherein the first and second fluid power means are attached to a common housing that is mountable on the valve.

7. A pipe coupling according to claim 6 including carriages slidably retained in the housing and functionally interconnecting the first and second fluid power means with the valve stem.

8. A pipe coupling according to claim 1 including a parallelogram linkage system for interconnecting the valve stem with a stem of a second valve in the other pipe section to accomplish simultaneous rotation of both valve stems.

9. A pipe coupling according to claim 1 wherein the means for preventing actuation of the collar release means comprises a mechanical system functionally interconnecting the flow control element and the first fluid power means, said mechanical system including links that accommodate misalignment of said first fluid power means.

10. A pipe coupling according to claim 1 wherein the first fluid power means includes a fluid-powered jack that is connected to at least one of the arcuate segments.

11. A pipe coupling according to claim 10 wherein the jack includes a rod with a conical head, wherein the collar release means includes knife means having a groove, and wherein said conical head and said groove cooperate to transmit a collar-releasing force from said conical head to said knife means only if the misalignment of said jack corresponding to a given angle of valve opening is within a predetermined quantity.

12. A pipe coupling according to claim 11 wherein the knife means includes an escape chamfer for permitting the conical head to pass by said knife means when said head is not within a predetermined alignment with said groove.

13. A pipe coupling according to claim 1 including manually operated locking means for preventing undesired actuation of said first fluid power means.

14. A pipe coupling according to claim 13 including sensor means to detect the locked and the unlocked condition of said locking means.

* * * * *